US008694135B2

(12) United States Patent
Koepcke et al.

(10) Patent No.: US 8,694,135 B2
(45) Date of Patent: Apr. 8, 2014

(54) PROGRAMMING PROGRAMMABLE LOGIC CONTROLLERS USING EXERTION INFLUENCE IN ESTABLISHING MATRIX PARAMETERS

(75) Inventors: Oliver Koepcke, Neuenburg (DE); Klaus Weddingfeld, Waldkirch (DE)

(73) Assignee: Sick AG, Waldkirch/Breisgau (DE)

( * ) Notice: Subject to any disclaimer, the term of this patent is extended or adjusted under 35 U.S.C. 154(b) by 337 days.

(21) Appl. No.: 13/050,610

(22) Filed: Mar. 17, 2011

(65) Prior Publication Data

US 2011/0230983 A1    Sep. 22, 2011

(30) Foreign Application Priority Data

Mar. 19, 2010   (EP) .................................. 10002949

(51) Int. Cl.
| | |
|---|---|
| G05B 19/42 | (2006.01) |
| G05B 19/18 | (2006.01) |
| G05B 19/04 | (2006.01) |
| G05B 19/042 | (2006.01) |
| G05B 19/425 | (2006.01) |

(52) U.S. Cl.
CPC .......... *G05B 19/0426* (2013.01); *G05B 19/425* (2013.01)
USPC .............. 700/86; 700/253; 700/257; 700/250

(58) Field of Classification Search
USPC .......................................................... 700/86
See application file for complete search history.

(56) References Cited

U.S. PATENT DOCUMENTS 5,119,318 A * 6/1992 Paradies et al. .................. 706/52
5,613,115 A * 3/1997 Gihl et al. ........................ 700/18

(Continued)

FOREIGN PATENT DOCUMENTS

| | | |
|---|---|---|
| DE | 10 2008 002 266 A1 | 1/2009 |
| EP | 1 362 269 B1 | 2/2005 |

(Continued)

OTHER PUBLICATIONS

Bogdan, S.; Smolic-Rocak, N. and Kovacic, Z., "A Testbed for Analysis of PLC-Controlled Manufacturing Systems", Jul. 2002, Proceedings of the 10th Mediterranean Conference on Control and Automation (MED2002).*

(Continued)

*Primary Examiner* — Mohammad Ali
*Assistant Examiner* — Kelvin Booker
(74) *Attorney, Agent, or Firm* — Nath, Goldberg & Meyer; Jerald L. Meyer

(57) ABSTRACT

The invention relates to an apparatus for the generation of a program for a programmable logic controller having a programming input unit for the selection and compilation of a plurality of symbols, a generation unit for the generation of a program code for the programmable logic controller from an arrangement of symbols compiled at the display unit of the programming input unit. In accordance with the invention an investigation unit for investigating the resulting possible influences of input signals of the programmable logic controller, onto output signals of the programmable logic controller at the actuator outputs from the arrangement of symbols generated by the program code or compiled at the display unit of the programming input unit is provided. In accordance with the invention an implementing unit for implementing the possible exertion of influence in a matrix and a display unit for the display of the matrix are also provided. The invention further relates to a programming device for a programmable logic controller having such an apparatus for the generation of a program, a corresponding method for programming a programmable logic controller and a corresponding computer program product.

14 Claims, 11 Drawing Sheets

(56) References Cited

U.S. PATENT DOCUMENTS

| | | | |
|---|---|---|---|
| 6,078,969 A * | 6/2000 | Ichimura et al. | 710/6 |
| 6,108,662 A * | 8/2000 | Hoskins et al. | 700/95 |
| 6,157,864 A * | 12/2000 | Schwenke et al. | 700/79 |
| 6,268,853 B1 * | 7/2001 | Hoskins et al. | 700/83 |
| 6,556,950 B1 * | 4/2003 | Schwenke et al. | 700/86 |
| 6,618,856 B2 * | 9/2003 | Coburn et al. | 700/86 |
| 6,862,553 B2 * | 3/2005 | Schwenke et al. | 700/86 |
| 6,983,227 B1 * | 1/2006 | Thalhammer-Reyero | 703/2 |
| 6,993,456 B2 * | 1/2006 | Brooks et al. | 700/86 |
| 7,225,037 B2 * | 5/2007 | Shani | 700/18 |
| 7,266,476 B2 * | 9/2007 | Coburn et al. | 700/86 |
| 7,308,550 B2 * | 12/2007 | Cornett | 711/170 |
| 7,310,720 B2 * | 12/2007 | Cornett | 711/170 |
| 7,321,800 B2 * | 1/2008 | Ludwig | 700/20 |
| 7,512,593 B2 * | 3/2009 | Karklins et al. | 700/100 |
| 7,546,232 B2 * | 6/2009 | Brooks et al. | 700/86 |
| 7,752,511 B2 * | 7/2010 | Fulton et al. | 714/725 |
| 7,788,476 B2 * | 8/2010 | McNutt et al. | 700/11 |
| 7,792,043 B2 * | 9/2010 | McNutt et al. | 370/242 |
| 7,860,874 B2 * | 12/2010 | Karklins et al. | 700/83 |
| 7,953,513 B2 * | 5/2011 | Bhat et al. | 700/197 |
| 8,296,733 B2 * | 10/2012 | Phillips et al. | 717/122 |
| 8,321,653 B2 * | 11/2012 | McNutt et al. | 713/1 |
| 2002/0120921 A1 * | 8/2002 | Coburn et al. | 717/140 |
| 2002/0194218 A1 | 12/2002 | Klapper et al. | |
| 2004/0073404 A1 * | 4/2004 | Brooks et al. | 702/183 |
| 2005/0085928 A1 * | 4/2005 | Shani | 700/18 |
| 2005/0163252 A1 * | 7/2005 | McCallister et al. | 375/296 |
| 2005/0278670 A1 * | 12/2005 | Brooks et al. | 716/5 |
| 2006/0010230 A1 * | 1/2006 | Karklins et al. | 709/223 |
| 2006/0069689 A1 * | 3/2006 | Karklins et al. | 707/100 |
| 2006/0212161 A1 * | 9/2006 | Bhat et al. | 700/197 |
| 2008/0091931 A1 * | 4/2008 | McNutt et al. | 713/1 |
| 2008/0091932 A1 * | 4/2008 | McNutt et al. | 713/1 |
| 2008/0125885 A1 * | 5/2008 | McNutt et al. | 700/81 |
| 2008/0126882 A1 * | 5/2008 | Fulton et al. | 714/48 |
| 2008/0127065 A1 * | 5/2008 | Bryant et al. | 717/109 |
| 2008/0133789 A1 * | 6/2008 | McNutt et al. | 710/30 |
| 2008/0313486 A1 * | 12/2008 | Parfitt | 713/600 |
| 2009/0024230 A1 | 1/2009 | Hioka et al. | |
| 2009/0030534 A1 | 1/2009 | Dold et al. | |
| 2009/0083522 A1 * | 3/2009 | Boggs et al. | 712/220 |
| 2009/0083705 A1 * | 3/2009 | Phillips et al. | 717/113 |
| 2009/0113247 A1 * | 4/2009 | Gofuku et al. | 714/37 |
| 2011/0098829 A1 * | 4/2011 | Weddingfeld et al. | 700/2 |
| 2011/0098830 A1 * | 4/2011 | Weddingfeld et al. | 700/79 |

FOREIGN PATENT DOCUMENTS

| | | |
|---|---|---|
| EP | 2 012 201 A1 | 1/2009 |
| WO | 00/38040 A1 | 6/2000 |

OTHER PUBLICATIONS

Gergely, E.O.; Coroiu, L. and Gacsadi, A., "Design of Safe PLC Programs by Using Petri Nets and Formal Methods", 2010, Recent Advances in Automation and Information, ICAI 2010.*

MTL Open System Technologies LP, "Matrix Total Control, A Proven Solution for Process Automation and Functional Safety", 2006, Retrieved from the Internet on Apr. 24, 2013 at "www.mtlmost.com".*

Siemens Energy and Automation, Inc., "SIMATIC Safety Matrix, Proceed with Confidence", 2007, Retrieved from the Internet on Apr. 24, 2013 at "www.siemens.com".*

Siemens AG, "Safety Integrated for Process Automation, Reliable, Flexible, Easy-Technical Brochure", Apr. 2008, Retrieved from the Internet on Apr. 24, 2013 at "www.siemens.com/process-safety".*

Siemens AG, "Safety Integrated for Process Automation, Reliable, Flexible, Easy-Technical Brochure", Apr. 2010, Retrieved from the Internet on Apr. 24, 2013 at "www.siemens.com/process-safety".*

Yokogawa System Center Europe B.V., "General Specifications, GS48E21A00-00E-N, Safety Matrix, ProSafe-PLC", May 2003, Retrieved from the Internet on Apr. 24, 2013.*

Extended European Search Report issued on Oct. 7, 2010, in corresponding European Application No. 10 00 2949.5.

SIEMENS: "Safety Integrated Systemhandbuch Sicherheitstechnik", Safety Integrated Systemhandbuch, 2005, pp. 7.10-7.17, XP-002599986.

SIEMENS: "Simatic, Safety Matrix, Configuration Manual", Simatic, 2010, pp. 17-23, XP-002599987.

Martinez, Robert et al., "The Importance of Single-Source Engineering of Emergency and Process Shutdown Systems", Computer Safety, Reliability, and Security Lecture Notes in Computer Science, 2005, pp. 13-23, LNCS 3688, XP-019020989.

Drath, Rainer et al., "Computer-aided design and implementation of interlock control code", Proceedings of the 2006 IEEE Conference on Computer Aided Control Systems Design, Munich, Germany, Oct. 4-6, 2006, pp. 2653-2658, XP-031420468.

"Projektieren statt programmieren", IEE 49, Jahrgang 2004, pp. 50-51, No. 4, (English abstract listed on cover page).

International Electrotechnical Commission, International Standard IEC 61131-3, Programmable controllers—Part 3: Programming languages, 2003, Second edition.

* cited by examiner

PROGRAMMING PROGRAMMABLE LOGIC CONTROLLERS USING EXERTION INFLUENCE IN ESTABLISHING MATRIX PARAMETERS

CROSS-REFERENCE TO FOREIGN APPLICATION

This is application claims priority under 35 U.S.C §119, from European patent Application No. EP 10002949.5, filed Mar. 19, 2010, the content of which is hereby incorporated by reference in its entirety.

BACKGROUND

1. Technical Field

The invention relates to an apparatus for the generation of a program for a programmable logic controller having a plurality of inputs and outputs which includes a program input unit having a display unit for the selection and compilation of a plurality of symbols and a generation unit for generating a program code for the programmable logic controller from an arrangement of symbols compiled at the display of the program input unit having a programming input unit having a display unit for the selection and compilation of a plurality of symbols, a generation unit for the generation of a program code for the programmable logic controller from a compiled arrangement of symbols at the display unit of the programming input unit.

The invention further relates to a programming unit for a programmable logic controller having such an apparatus for the generation of a program, a corresponding method for programming a programmable logic controller including the steps of selecting and compiling symbols at a display unit of a programming input unit which includes symbols in accordance with a desired programming at least for transmitter inputs, actuator outputs, predefined program modules and signal connection paths, generating a program code for the programmable logic controller from the compiled arrangement of symbols at the display unit of the program input unit and transferring the program code to a programmable logic controller and to a computer program product for use with such an apparatus, such a programming unit and/or such a method.

2. Related Art

Nowadays automated solutions are frequently realized by means of programmable logic components. Partial problems are programmed in separate program modules (functional components, macros) and are used in superimposed units.

Programmable logic controllers (PLC's) are used in particular for safety controls which are programmed corresponding to safety requirements. During operation signals of transmitters are present at the inputs of such a safety control, for example, signals of specific sensors such as motion detectors, light barriers or similar can be present. The outputs of the safety controllers are connected to actuators which initiate specific processes in dependence on the signals of the transmitters present at the inputs. Thereby, for example a safety controller can be provided that switches off a machine or transmits a warning signal on receiving a corresponding input signal.

In a method known from EP 1 362 269 B1 the respectively required program modules are selected and compiled to a program which is suitable for the operation of a safety control in the course of a programming procedure. To increase the clarity during programming and to avoid programming errors these selectable program modules are displayed at a first part of a display surface and compiled, for example, by means of drag-and-drop into a different monitor region, which monitor region corresponds to a programming interface.

EP 2 012 201 A1 describes a method for programming a safety controller to be connected to transmitters and to actuators in which initially a wiring diagram is generated. The safety controller is schematically displayed at a graphical programming interface with its connection clamps. Transmitters and actuators are selected by means of transmitter symbols and actuator symbols. Wiring symbols are displayed at the programming interface which connect the transmitter symbols and the actuator symbols with the connection clamps associated therewith. Using this information a program for the safety control is generated, wherein program parts are automatically activated and/or compiled which are provided for the evaluation of the selected transmitters and the control of the selected actuators. Parameters are automatically associated with these program parts which corresponds to those connection clamps to which the respective transmitter symbols and actuator symbols are connected.

With the aid of such programming methods or using programming languages described for example in the norm DIN EN 61131-3 (for example, FCL—"functional component language" corresponding to FBD—"function block diagram"; LD—"ladder diagram"; IL—"instruction list"; ST—"structured text" the program for a programmable logic controller can be intuitively generated by means of graphic symbols. In this respect graphic symbols describe, amongst other things, transmitter inputs and actuator outputs, or alternatively transmitters and actuators to be connected. Using this information it is already determined how the respective inputs and outputs of the programmable logic controller have to be configured to be able to communicate with the respective transmitters and actuators.

Program modules used are for example pre-programmed functional components or macros which can be stored in a program library. Program modules can also be formed by logic links such as AND, OR, XNOR etc.

Through this type of programming and because of the increasing complexity the clarity can, however, be lost.

In particular, for complex applications having a large number of logic intermediate sizes it can in this respect be difficult to comprehend which inputs of the safety controller interact with which outputs of the safety controller. Thus it is frequently difficult to recognize what influence the change of a signal at a certain input of the safety controller has on which output of the safety controller. To illustrate the connections between the inputs and the outputs of the programmable logic controller it is necessary to generate and to evaluate a logic report which frequently comprises a plurality of pages.

SUMMARY OF THE INVENTION

It is the object of the present invention to provide an apparatus for the generation of a program for a programmable logic controller, a programming unit for a programmable logic controller and/or a method for programming a programmable logic controller with whose aid it is possible to recognize in a simple and clear manner the influence of signals at the inputs of the programmable logic controller signals on the outputs of the programmable logic controller.

This object is satisfied with an apparatus for the generation of a program for a programmable logic controller having an investigation unit for investigating the resulting possible influences of input signals, which are delivered from the transmitter inputs to the programmable logic controller, on output signals, which are delivered by the programmable logic controller at the actuator outputs, from the arrangement of symbols generated by the program code or compiled at the display unit of the programming input unit, wherein the exertion of influence specifies which input signals into the programmable logic controller can have an influence, in accordance with the program code or the arrangement of symbols compiled at the display unit, on which output signals of the programmable logic controller, having an implementing unit for implementing the possible exertion of influence in a matrix and having a display unit for the display of the matrix. The dependent claims are directed at preferred embodiments of the invention.

In accordance with the invention, in particular an investigation unit is provided with which the possible exertion of influence of input signals which are delivered from the transmitter inputs to the programmable logic controller on output signals which are delivered from the programmable logic controller to the actuator outputs resulting from the generated program code or the arrangement of symbols compiled at the display unit of the program input unit is determined. The term "possible exertion of influence" should in this respect indicate which inputs of the programmable logic controller can have what influence on which outputs of the programmable logic controller in accordance with the program code or the arrangement of symbols compiled at the displaying unit when the program generated with the aid of the apparatus in accordance with the invention is used in the programmable logic controller. The term "possible exertion of influence" should thus not be understood such that the type and manner of the influence is necessarily meant but only whether under consideration of the generated program any influence can generally take place.

In accordance with the invention an implementing unit is further provided with whose aid these possible exertions of influence can be implemented in a matrix. A display unit serves for the display of this matrix.

With the aid of the apparatus in accordance with the invention it is thus possible for the user to recognize in a simple way and manner which inputs of the programmable logic controller have what influence on which outputs. Thus, the user of the control obtains a quick overview over the correlations without an elaborate logic report having to be evaluated.

This is of particular advantage, in particular, when using a safety programmable logic controller. Precisely then it is of great importance that the correlations are quickly determined and possible error sources are avoided which can arise due to a confusing display.

An apparatus in accordance with the invention can be used particularly advantageously and intuitively when the symbols for the transmitter inputs and/or the symbols for the actuator outputs which are used at the display unit of the program input unit are themselves displayed by symbols or designations for the corresponding transmitters and/or actuators.

For such a preferred embodiment also the selection of corresponding transmitter symbols and/or actuator symbols for the transmitters and actuators which can be connected to the programmable logic controller, information about the respective transmitter and/or actuator can be read out, for example from a memory library, to configure the connections of the programmable logic controller to which the selected transmitters and/or the selected actuators should be connected in accordance with the information stored in the memory.

Also for the display unit for the display of the matrix from which the possible exertion of influence of the transmitter inputs on the actuator outputs can be read out, it is of particular advantage, when the transmitter inputs and/or the actuator outputs are represented by symbols and/or designations which correspond to the transmitters and/or the actuators to be connected at the transmitter inputs and/or the actuator outputs.

In principle the generation of the program for the programmable logic controller can be realized in a variety of ways with the aid of a programming input unit at which the symbols, the program modules and the inputs and the outputs are displayed. A particularly simple and intuitive method includes the drag-and-drop method in which, with the aid of, for example, a computer mouse, symbols are clicked at the screen and then dragged to the desired position in a programming region of the display unit.

It can be provided to receive all inputs and outputs of the programmable logic controller and/or the transmitters and actuators to be connected thereto in a matrix display in accordance with the invention. It can, however, be sensible to only display a selection of the inputs of the programmable logic controller and/or the transmitters to be connected thereto in such a matrix which illustrates the possible influences of the input signals on the output signals so as not to lose the clarity. In particular, for a safety control it can be sensible to, for example, only consider such inputs which are supplied with safety-relevant information by transmitters and to consider their influence on possible outputs of the safety control.

On the other hand, it can also be sensible to, for example, only consider such outputs which are associated with the safety-relevant actuators and to only display these outputs in the matrix.

The display of the program input unit, at which the symbols are compiled to generate the program for the programmable logic controller, and the display unit for the display of the matrix, which matrix contains the information on which outputs of the programmable logic controller are influenced by certain input signals, can be different output devices. However, it is particularly advantageous if the display is carried out at a common display, for example a monitor.

Advantageously the display of the matrix can be illustrated with the aid of a possibly additionally provided output unit, preferably a printer, to permanently have the correlations at ones disposal.

The object in view of the programming unit is satisfied with a programming unit for a programmable control which includes an apparatus in accordance with the invention for the generation of a program for the programmable logic controller and an interface for the connection of the programmable logic controller to be programmed and for the transfer of the generated program code to the programmable logic controller. The program for the programmable logic controller can initially be generated and displayed in a matrix in accordance with the invention with the aid of such a programming unit. The program can then be transferred to the programmable logic controller via the interface.

The object of the invention in view of the method is satisfied by a method for programming a programmable logic controller including the steps of determining and displaying, in the form of a matrix, the resulting possible influences of input signals, which are delivered from the transmitter inputs to the programmable logic controller, on output signals, which are delivered from the programmable logic controller to the actuator outputs, from the arrangement of symbols compiled with the program code or at the display of the program input unit, wherein the exertion of influence specifies which input signals of the programmable logic controller can have what influence, in accordance with the program code or the arrangement of symbols compiled with at the display unit, on which output signals of the programmable logic controller.

The advantages of a method in accordance with the invention result from the advantages for the apparatus in accordance with the invention already described above and from the programming unit in accordance with the invention already described above.

Advantageous embodiments of the method in accordance with the invention are the subject matter of dependent claims. The advantages of such preferred embodiments result from the above-described advantages of particular embodiments of the apparatus in accordance with the invention.

The invention moreover includes a computer program product for use with an apparatus in accordance with the invention, a programming device in accordance with the invention or a method in accordance with the invention. The computer program product in accordance with the invention is configured such that on carrying out at a computer the possible exertion of influence of input signals, which are delivered from the transmitter inputs to the programmable logic controller, have on output signals, which are delivered from the programmable logic controller to the actuator outputs, due to the generated program code or the compiled arrangement of symbols displayed at the programming input unit is determined and displayed in the form of a matrix.

Such a computer program product can, for example, be a computer program having program steps which cause the display of the matrix from the configuration of the programmable logic controller. Also the computer program product in accordance with the invention can be memory medium with a corresponding computer program saved thereon.

BRIEF DESCRIPTION OF THE DRAWINGS

The invention will be described in detail with reference to the submitted schematic drawings which show an embodiment of the apparatus in accordance with the invention.

FIG. 2a shows the programming with the aid of a drag-and-drop method with reference to the programming example shown in FIG. 1a.

DETAILED DESCRIPTION

Figure 1A:
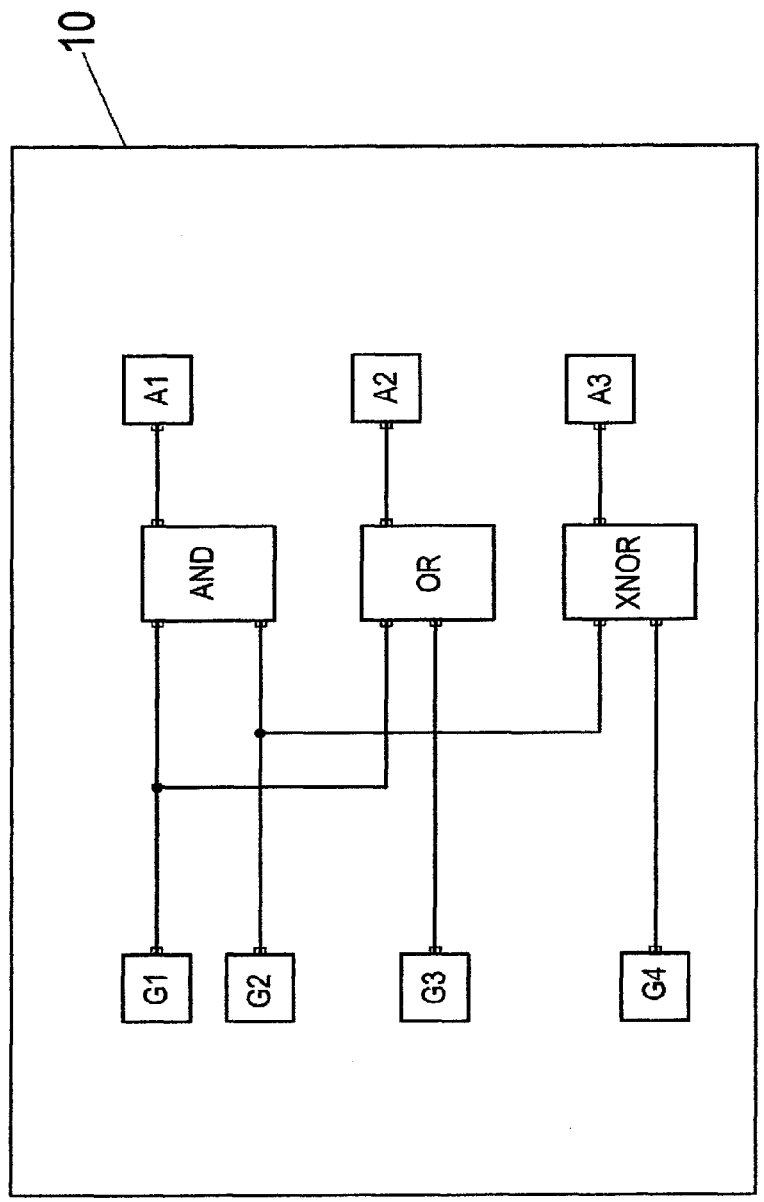
FIG. 1a shows a programming region of a display unit of a program input unit of an apparatus in accordance with the invention for the generation for a program for a programmable logic controller with a programming example.

In FIG. 1a the example of a programming of a programmable logic safety controller is illustrated at the programming region 10 of a screen. In this case four transmitters are to be connected to the transmitter inputs G1, G2, G3, G4 of the programmable logic controller. Three actuators are to be connected at the actuator outputs A1, A2, A3 of the programmable logic safety controller.

Different program modules, in this case the logic links AND, OR and XNOR are provided in the notation in accordance with Boolean algebra are for example, provided to link the signals of the individual transmitters with one another and to generate corresponding output signals for the actuators. For this reason corresponding connection lines are shown between the transmitters, the logic links and the outputs.

The program modules are not limited to a single logic link. The program modules can also be pre-programmed program parts, functional components or macros, which are stored in a corresponding memory library.

Figure 2A:
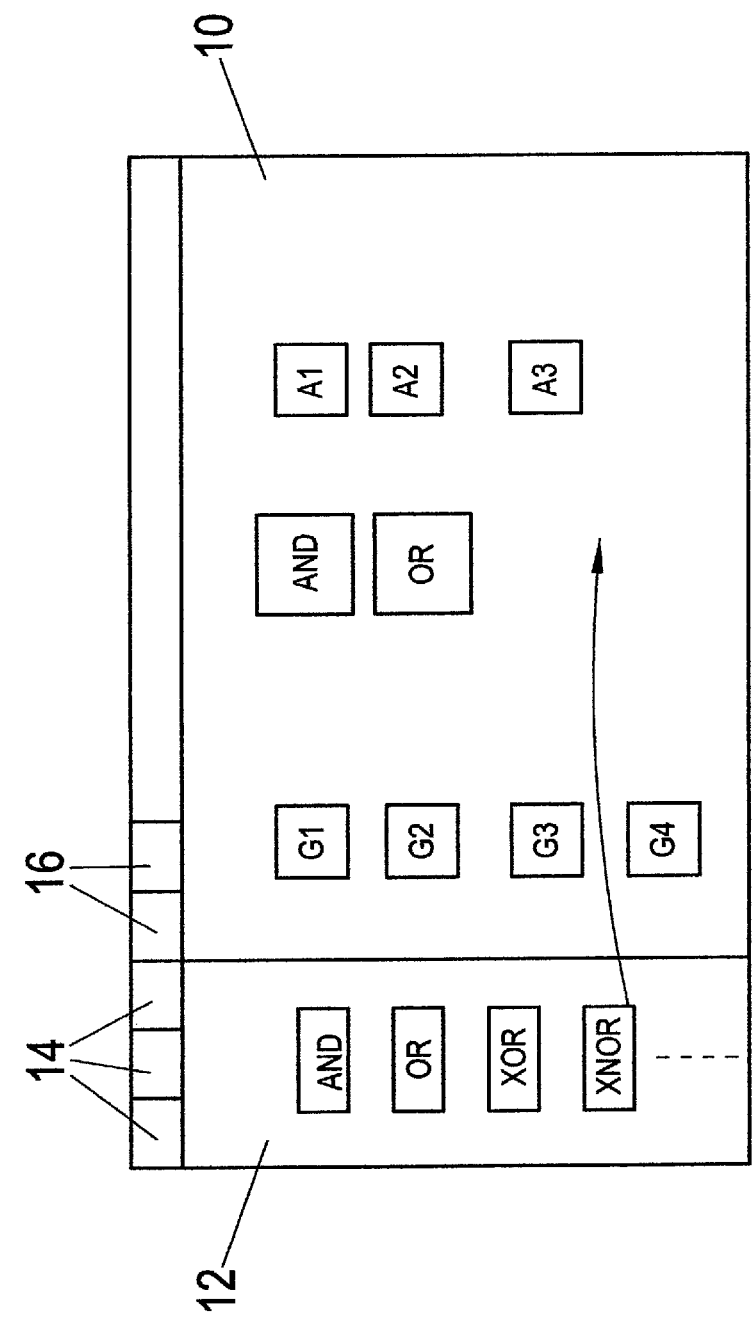

FIG. 2a shows a step of producing the program which is illustrated at the program region 10 of the screen in FIG. 1a.

FIG. 2a in this respect shows, amongst other things, the monitor region 10 in which the completed program should be graphically illustrated. The different components can be displayed in a monitor region 12 which can be selected for the generation of the program. Selection icons are shown for this reason in a menu in the monitor region 14 which can be clicked at, for example, with the aid of a computer mouse to specify whether the transmitters, the links or the actuators should be selected. In the present example, the links are being established. To select the links a corresponding field 14 was clicked at which initiates the display of the selectable links for the monitor region 12.

The symbols for an AND link and an OR link are already present in the monitor region 10. A third linking (here an XNOR link) is desired. It is clicked at in the left monitor region 12 and moved into the monitor region 10 for the programming with the computer mouse.

In the programming region 10 of the screen the symbols for four different transmitter inputs G1, G2, G3 and G4 are already present. In this respect, it can, for example, be inputs for the signals of sensors or switches whose position is important for the programmable logic controller. Moreover, three different actuator outputs A1, A2 and A3 are already selected with which the programmable logic controller should be connected with corresponding actuators. In this respect, these can, for example, be valves, warning lamps or stop signals for machines.

Following the programming step illustrated in FIG. 2a the connection paths between the individual transmitter inputs, the logic links and the actuator outputs are generated at the monitor region 10 to thereby obtain a graphical illustration in accordance with FIG. 1a.

Transmitter inputs of the programmable logic controller are selected in accordance with the transmitters to be connected so that the respective input can already be configured on programming the programmable logic controller by correspondingly possibly saved software in a memory. One proceeds in precisely the same manner with the actuators and also with the corresponding actuator outputs.

In this respect it is very intuitive when the transmitter inputs are simply displayed and selected by the corresponding transmitters and the actuator outputs are simply displayed and selected by the actuators to be connected. This shall be explained with reference to an example. For example, a first and a second emergency stop switch should be connected at the transmitter inputs G1 and G2. The signals of sensors for an opening state of a first emergency exit and a second emergency exit should be connected at the transmitter inputs G3 and G4. Symbols for the first emergency stop and the second emergency stop switch and symbols for the sensors of the opening state of the first emergency exit and the second emergency exit are then displayed at the corresponding position of the programming region 10. For example, a first and a second valve and a warning lamp should be connected at the actuator outputs A1 to A3. The symbols A1, A2 and A3 in the programming region 10 would then include the symbols or designations for the first valve and the second valve and/or the warning lamp.

Figure 1B:
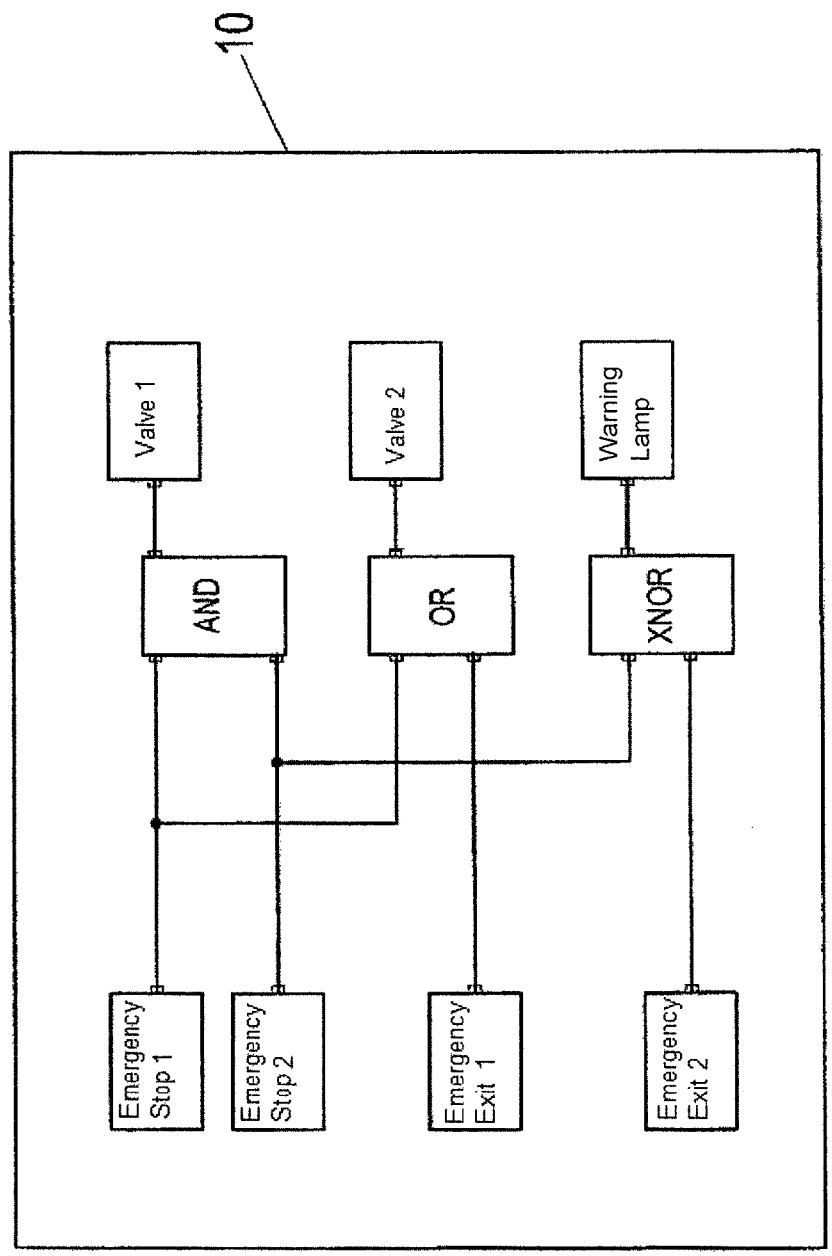
FIG. 1b shows the example in a certain display form.

This form of illustration is shown for the programming examples of FIGS. 1*a* and 2*a* in FIG. 1*b* and/or 2*b*. Otherwise the functionality is the same.

In a manner known per se a program of the programmable logic controller is then generated from the illustration of the program by means of the symbols. In this respect the selection of transmitter inputs and of actuator outputs and/or of the transmitters and of the actuators by means of the symbols also determines how the inputs and/or the outputs of the programmable logic controller have to be configured to cooperate with the corresponding transmitters and/or actuators. For this reason the transmitter inputs G1 to G4 and the actuator outputs A1 to A3 are individualized for the corresponding transmitters and actuators.

The program generated in this manner can then be transferred via a corresponding, not illustrated interface to the programmable logic controller to program this. Thus, in this manner it is determined within the programmable logic controller which inputs are logically linked to which outputs. The corresponding transmitters and actuators can then be connected to enable the operation.

Figure 2B:
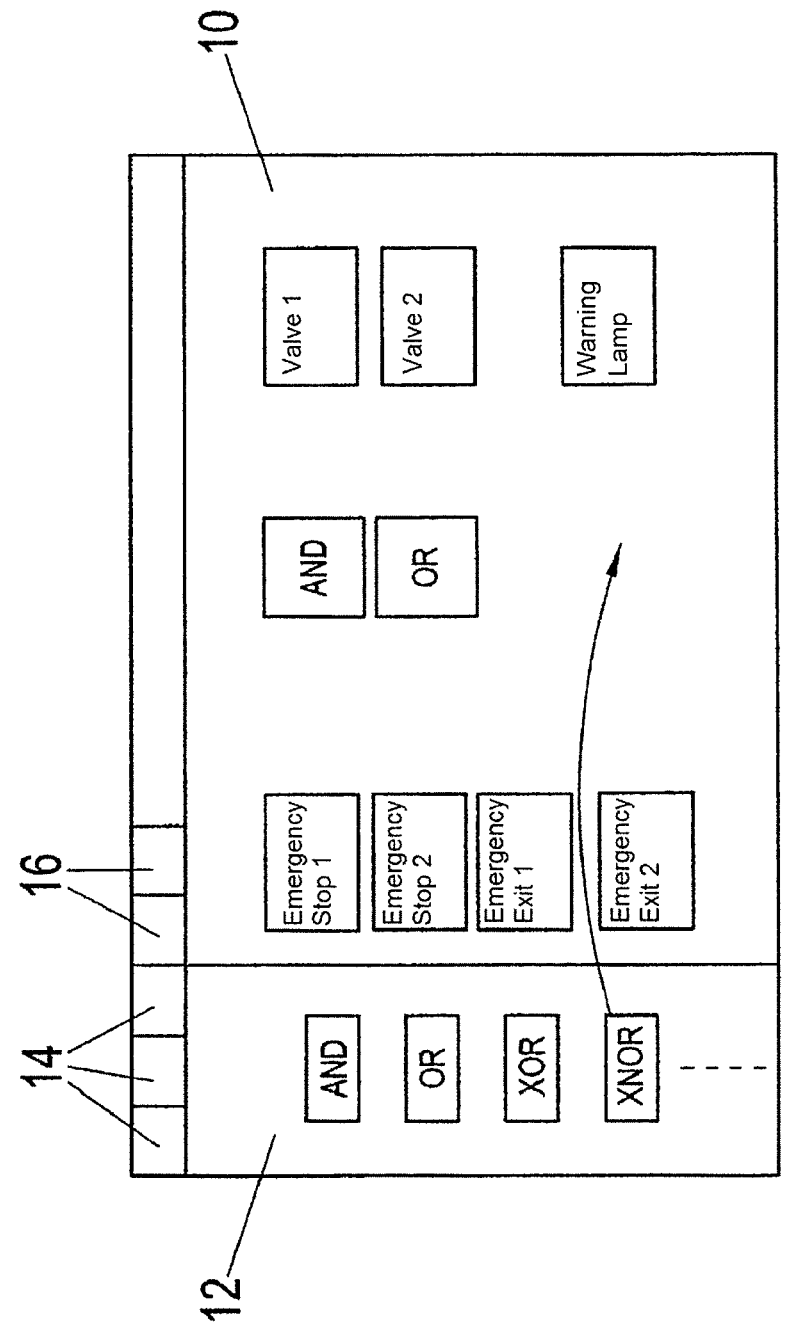
FIG. 2b shows the programming with the aid of a drag-and-drop method with reference to the illustration shown in FIG. 1b.

Through selection of corresponding icons 16 of a menu in the monitor illustration of FIG. 2*a* and/or of FIG. 2*b* it can be selected whether the logical links should be illustrated, for example, at the monitor region 10 as is visible in FIG. 1*a* and/or FIG. 1*b* or by means of a different representation.

Figure 3A:
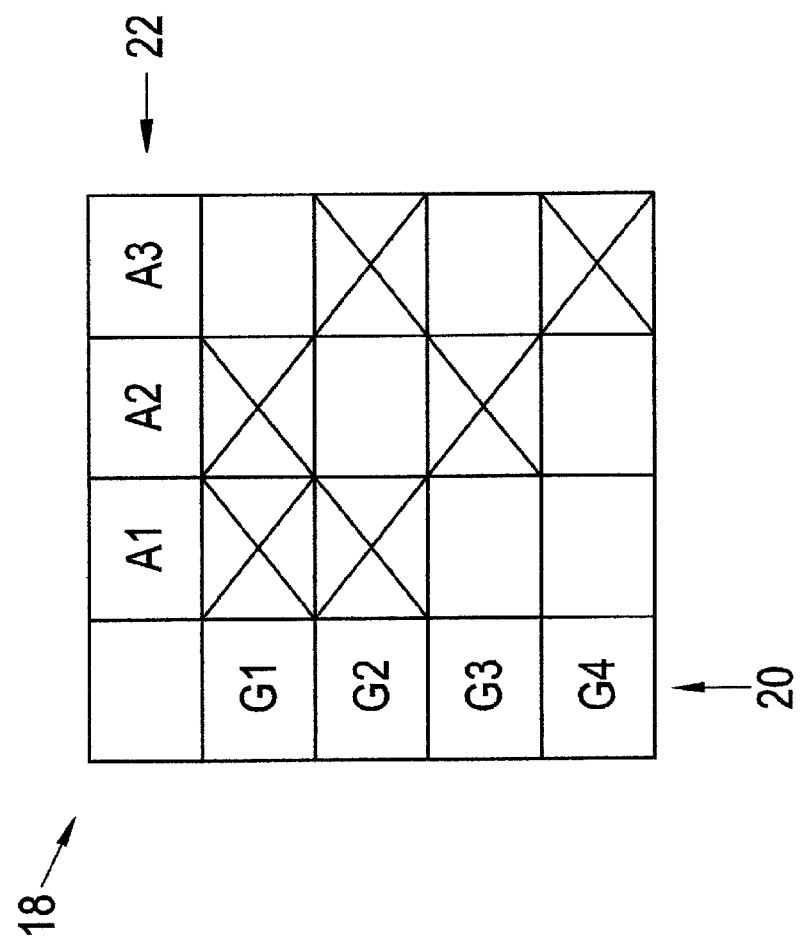
FIG. 3a shows a matrix display resulting from the programming example illustrated in FIG. 1.

Such a different representation is shown in FIG. 3*a*. In accordance with the invention a matrix is shown here in which it is provided which transmitter inputs have what influence on which actuator outputs. The transmitter inputs are shown in the column 20 and the actuator outputs are shown in the line 22.

In the matrix it is recognizable that the signals of the transmitter input G1 has an influence on the actuator output A1 and on the actuator output A2 as can also be found from the illustration in FIG. 1. The transmitter input G2 has influence on the actuator outputs A1 and A3. The transmitter input G3 only has an influence on the actuator output A2 and the transmitter G4 only has an influence on the actuator output A3.

With the aid of this matrix it is possible for a user to easily recognize whether a change of an input signal at the programmable logic controller, for example the transmitter input G1, has an influence on a very specific actuator which is connected at a specific actuator output of the programmable logic control.

Figure 3B:
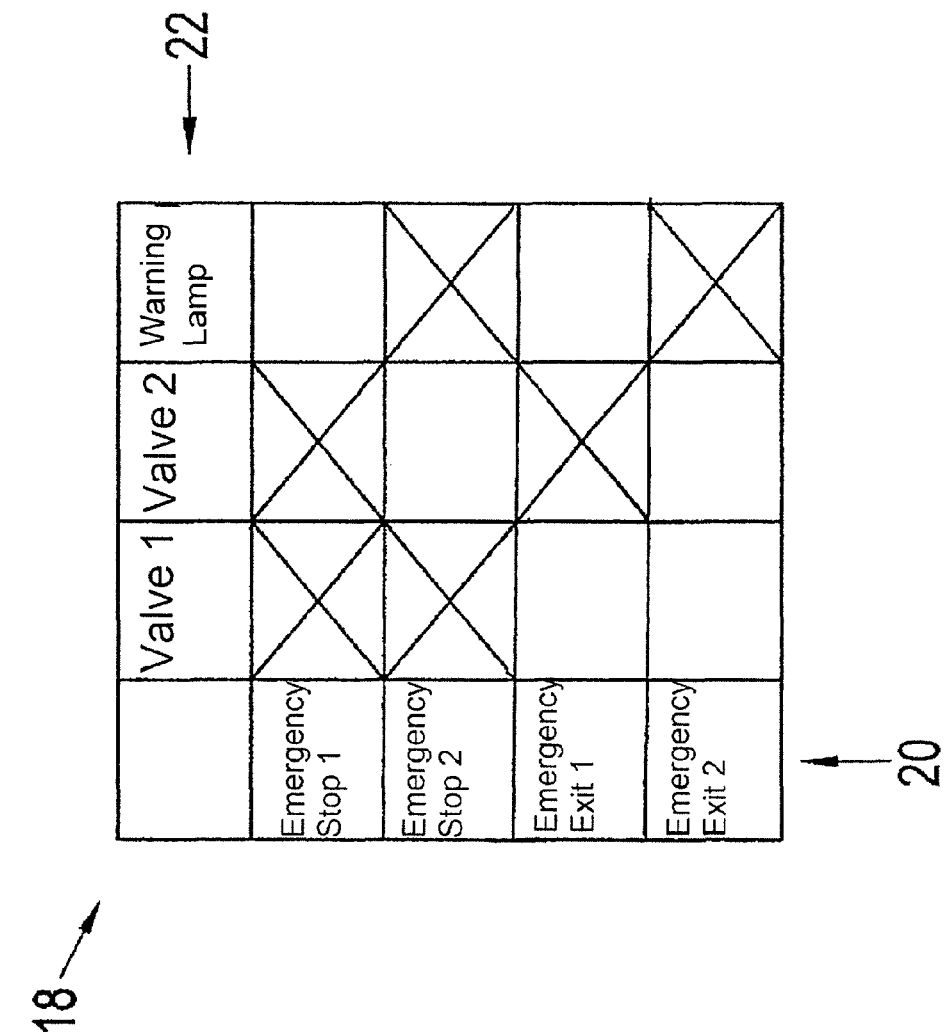
FIG. 3b shows an example for a certain illustration of the matrix.

The respective transmitter inputs and actuator outputs can also be represented in this matrix, for example, also by symbols or designations which correspond to the transmitters or the actuators to be connected. For the above-described example a specific matrix illustration is given in accordance with FIG. 3*b* in which the transmitter inputs G1, G2, G3, G4 are to be connected to a first emergency stop switch and a second emergency stop switch and to the signal of a first emergency exit and a second emergency exit and the actuator outputs A1, A2, A3 should be connected to a first valve and a second valve and a warning lamp.

Figure 4:
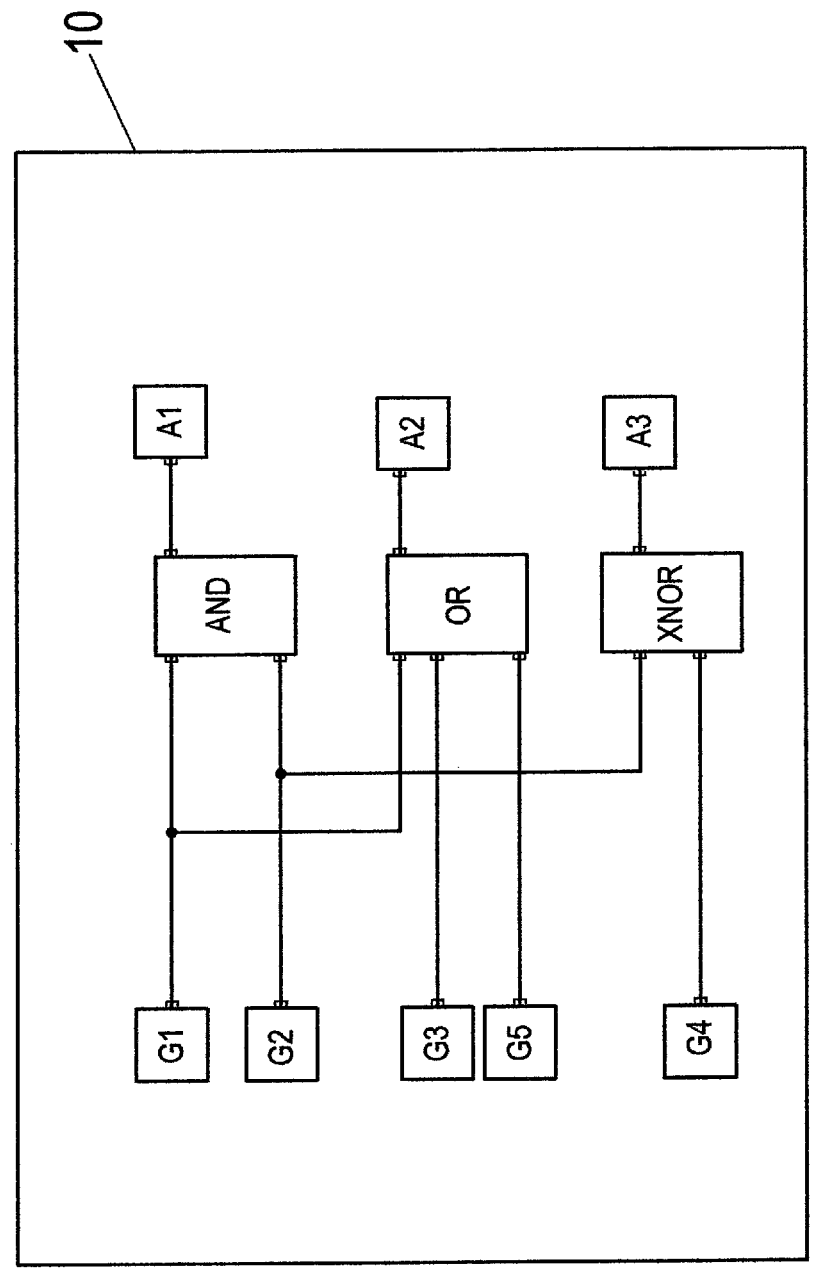
FIG. 4 shows a different programming of a programmable logic controller.
Figure 5:
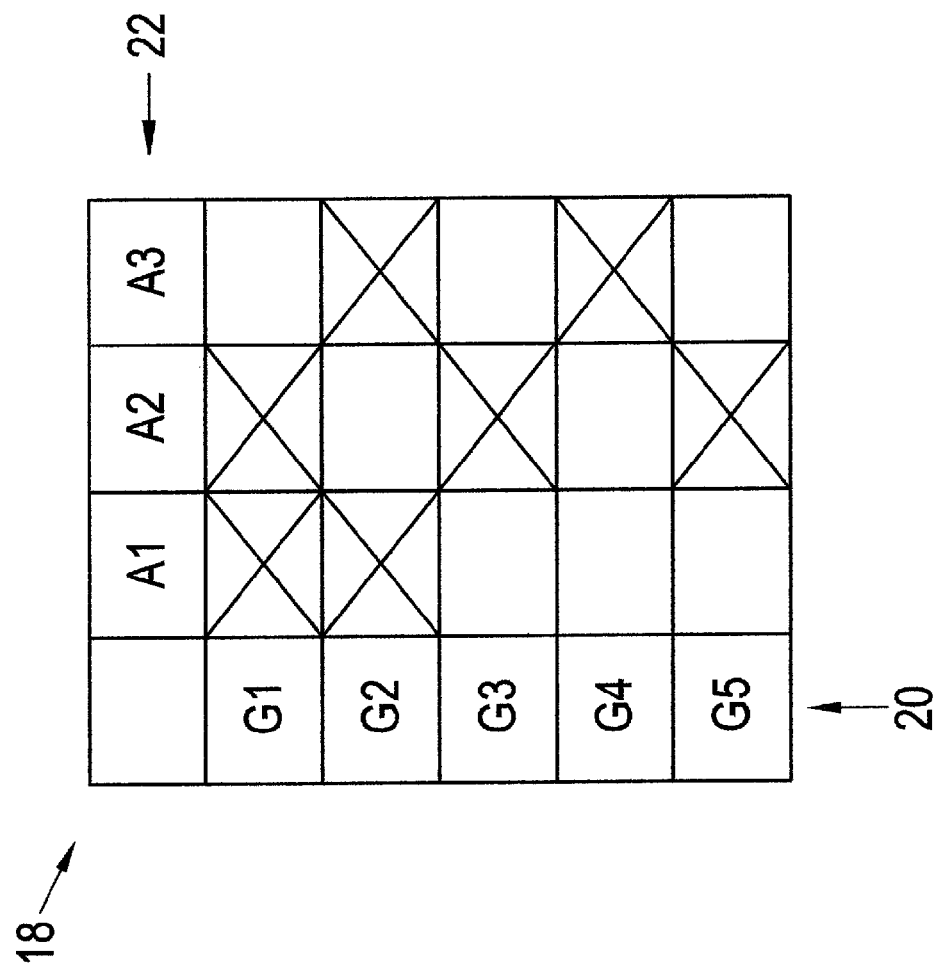
FIG. 5 shows the thereby resulting matrix illustration.

FIG. 4 shows a programming example for a program for a programmable logic control. In this respect an additional transmitter is provided which should be connected to the transmitter input G5 and is connected to the actuator output A2 via the logic OR link. This transmitter input G5 is also received in the matrix illustration, wherein it is illustrated here that it only has an influence on the actuator output A2. The corresponding matrix is the subject of FIG. 5.

On programming here in turn in a manner known per se the transmitter input G5 is configured such that it can cooperate with the selected transmitter.

Figure 6:
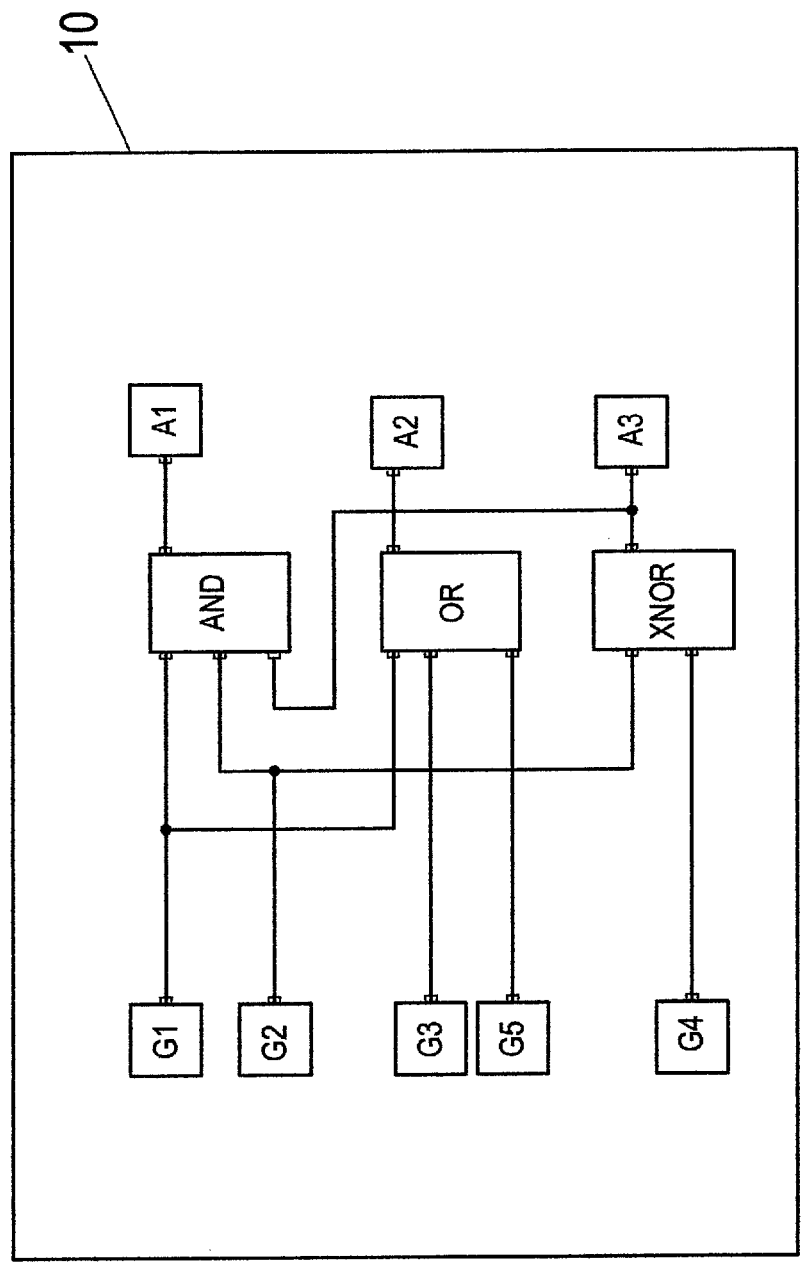
FIG. 6 shows a further example of a programming of a programmable logic controller.

FIG. 6 shows a further example for the programming of a programmable logic controller. Here the output of the XNOR link is not only connected to the actuator output A3 but is also connected to the upper AND link recognizable in the upper part. In this manner, also the transmitter input G4 has an influence also on the actuator output A1 via the XNOR link and the AND link.

Figure 7:
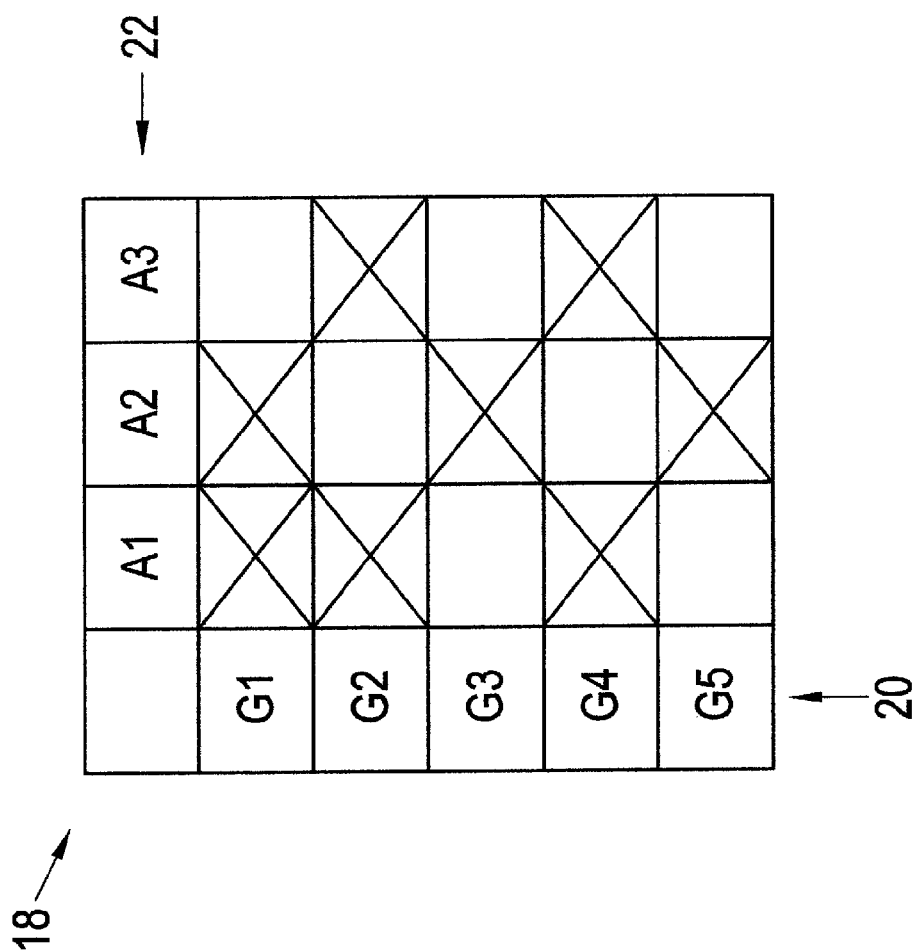
FIG. 7 shows the thereby resulting matrix illustration.

This can be recognized in the matrix illustration of FIG. 7 which displays this information to the user in a clear manner.

Figure 8:
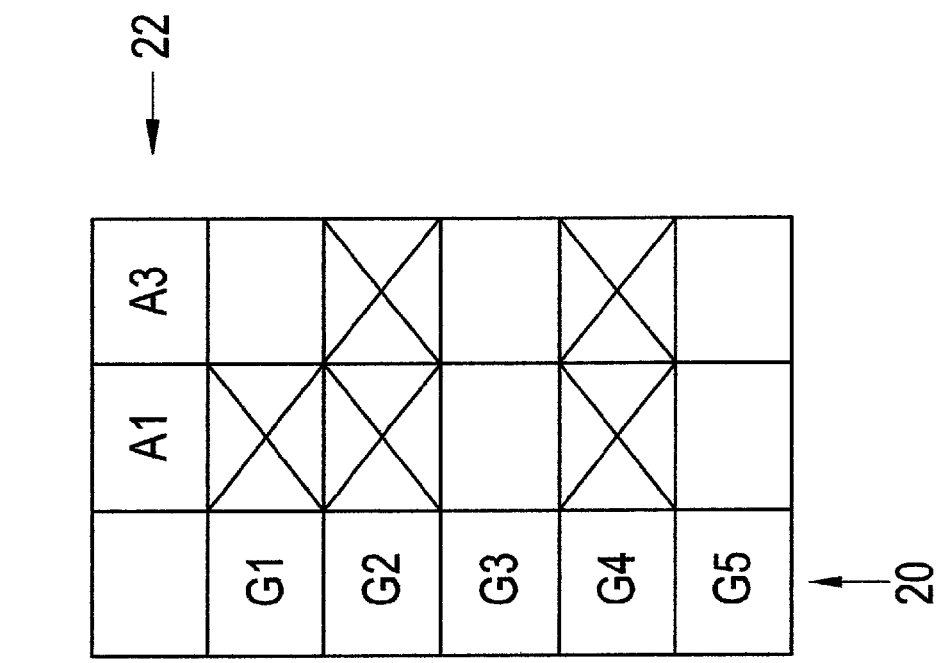
FIG. 8 shows a matrix illustration with reduced scope.

FIG. 8 shows a particular matrix illustration starting from the graphically illustrated program of FIG. 6. For example, the actuator output A2 to be connected to the actuator which is not a safety-relevant actuator here, i.e., for example, an actuator which only actuates background illumination or such like.

When the user is only interested in which transmitter can have an influence on safety-relevant actuator outputs he can, for example, prevent the display of the actuator output A2 in the matrix display. In this way he can, for example, filter out the safety-relevant information to detect this important information faster.

The matrix illustration in accordance with the invention thus enables a simple overview of which transmitter which is connected to the safety controller has an influence on which actuator which is connected to the safety control. For this reason the corresponding transmitter inputs and the actuator outputs of the safety control are illustrated in a matrix illustration and a possible exertion of influence is marked.

The examples shown in the Figures only serve for the purpose of illustration. In actual fact a much larger number of transmitters and a much larger number of actuators are as a rule connected to a programmable logic controller which transmitters and actuators are coupled to one another via the program in the programmable logic controller. When such a program is illustrated in the display, for example of FIG. 1, of FIG. 4 or of FIG. 6, the individual correlations are difficult to recognize, as a large number of linking operators and links have to be illustrated. A reduction of the illustration to a matrix display corresponding, for example to FIG. 3, 5, 7 or 8 in this way enables a programmable logic controller to easily detect, in particular, also for a complex programming and for many inputs and many outputs, which transmitter connected to the programmable logic controller via a corresponding transmitter input has an influence on which actuator connected to the programmable logic controller via a corresponding actuator output.

List of Reference Numerals

10 programming monitor region
12 selection monitor region
14, 16 selection icons
20 matrix column for the transmitter inputs
22 matrix line for the actuator outputs
G1, G2, G3, G4, G5 transmitter inputs of the programmable logic controller
A1, A2, A3 actuator outputs of the programmable logic controller

The invention claimed is:

1. An apparatus for the generation of a program for a programmable logic controller having a plurality of inputs and outputs and comprising:

a programming input unit having a display unit (10) for the selection and compilation of a plurality of symbols, which includes symbols for at least:
  (i) transmitter inputs via which input signals from transmitters can be delivered to the programmable logic controller,
  (ii) actuator outputs via which output signals can be delivered from the programmable logic controller to the actuators,
  (iii) predefined program modules, and
  (iv) signal connection paths;
a generation unit for the generation of a program code for the programmable logic controller from a compiled arrangement of symbols at the display unit (10) of the programming input unit,
an investigation unit for investigating the possible exertion of influences of input signals, which are delivered from the transmitter inputs (G1, G2, G3, G4, G5) to the programmable logic controller, on output signals, which are delivered by the programmable logic controller at the actuator outputs (A1, A2, A3), resulting from the generated program code or from the arrangement of symbols compiled at the display unit (10) of the programming input unit, wherein the exertion of influence specifies which input signals into the programmable logic controller can have an influence, in accordance with the program code or the arrangement of symbols compiled at the display unit (10), on which output signals of the programmable logic controller;
an implementing unit for implementing the possible exertion of influence in a matrix; and
a display unit for the display of the matrix (18) comprising an output unit.

2. An apparatus in accordance with claim 1, wherein it is an apparatus for the generation of a program for a memory programmable safety controller.

3. An apparatus in accordance with claim 1, wherein the transmitter inputs (G1, G2, G3, G4, G5) and the actuator outputs (A1, A2, A3) are displayed at the display unit (10) of the program input unit and/or are indicated to the display unit for the display of the matrix (18) by symbols for the transmitters and actuators.

4. An apparatus in accordance with claim 1, wherein the programming input unit is configured such that the selection and compilation of the symbols can be carried by means of a drag and drop process.

5. An apparatus in accordance with claim 1, wherein a first selector for the formation of a selection of the actuator outputs (A1, A2, A3) to be displayed in the matrix and/or a second selector for the formation of a selection of transmitter inputs (G1, G2, G3, G4, G5) to be displayed in the matrix is/are provided.

6. An apparatus in accordance with claim 1, wherein the display unit of the programming input unit and the display unit for the display of the matrix include a common display (10).

7. An apparatus in accordance with claim 1, wherein the display unit (10) for the display of the matrix (18) further comprises a printer.

8. A programming device for a programmable logic controller having an apparatus for the generation of a program comprising:
  a programming input unit having a display unit (10) for the selection and compilation of a plurality of symbols, which includes symbols for at least transmitter inputs, actuator outputs, predefined program modules and signal connection paths;
  a generation unit for the generation of a program code for the programmable logic controller from a compiled arrangement of symbols at the display unit (10) of the programming input unit;
  an investigation unit for investigating the possible exertion of influences of input signals, which are delivered from the transmitter inputs (G1, G2, G3, G4, G5) to the programmable logic controller, on output signals, which are delivered by the programmable logic controller at the actuator outputs (A1, A2, A3), resulting from the generated program code or from the arrangement of symbols compiled at the display unit (10) of the programming input unit, wherein the exertion of influence specifies which input signals into the programmable logic controller can have an influence, in accordance with the program code or the arrangement of symbols compiled at the display unit (10), on which output signals of the programmable logic controller;
  an implementing unit for implementing the possible exertion of influence in a matrix and
  a display unit for the display of the matrix (18) comprising an output unit; and
  said programming device further comprises an interface for the connection of the programmable logic controller to be programmed and for the transfer of the generated program code to the programmable logic controller.

9. A method for programming a programmable logic controller having the following steps:
  selection and compilation of symbols at a display unit (10) of a programming input unit which includes symbols in accordance with a desired programming at least for:
    (i) transmitter inputs via which input signals of transmitters are delivered to a programmable logic controller,
    (ii) actuator outputs via which the output signals are delivered from the memory programmable logic to the actuators,
    (iii) predefined program modules and
    (iv) signal connection paths;
  generation of a program code for the programmable logic controller from the compiled arrangement of symbols at the display unit (10) of the program input unit; and
  transfer of the program code to a programmable logic controller,
  wherein
  the possible exertion of influences of input signals, which are delivered from the transmitter inputs (G1, G2, G3, G4, G5) to the programmable logic controller, on output signals, which are delivered from the programmable logic controller to the actuator outputs (A1, A2, A3), resulting from the generated program code or from the arrangement of symbols compiled with the program code or at the display of the program input unit (10) are determined, displayed and output in the form of a matrix (18), wherein the exertion of influence specifies which input signals of the programmable logic controller can have what influence, in accordance with the program code or the arrangement of symbols compiled with at the display unit (10), on which output signals of the programmable logic controller.

10. A method in accordance with claim 9, wherein it is a method for programming a memory programmable safety controller.

11. A method in accordance with claim 9, wherein the transmitter inputs (G1, G2, G3, G4, G5) and the actuator outputs (A1, A2, A3) are displayed at the display unit (10) of the programming input unit and/or the display unit for the display of the matrix by symbols for the transmitters and actuators.

12. A method in accordance with claim 9, wherein only selected transmitter inputs (G1, G2, G3, G4, G5) are displayed in the matrix (10) and/or only selected actuator outputs (A1, A2, A3) are displayed in the matrix (18).

13. A method in accordance with claim 12, wherein the transmitter inputs, which are displayed in the matrix, are selected in accordance with whether safety relevant signals are transferred via said transmitter inputs to the memory programmable safety controller to be programmed.

14. A method in accordance with claim 12, wherein the actuator outputs, which are displayed in the matrix, are selected in accordance with whether safety relevant signals are transferred via said actuator outputs from the memory programmable safety controller to be programmed.

* * * * *